Figure 1:
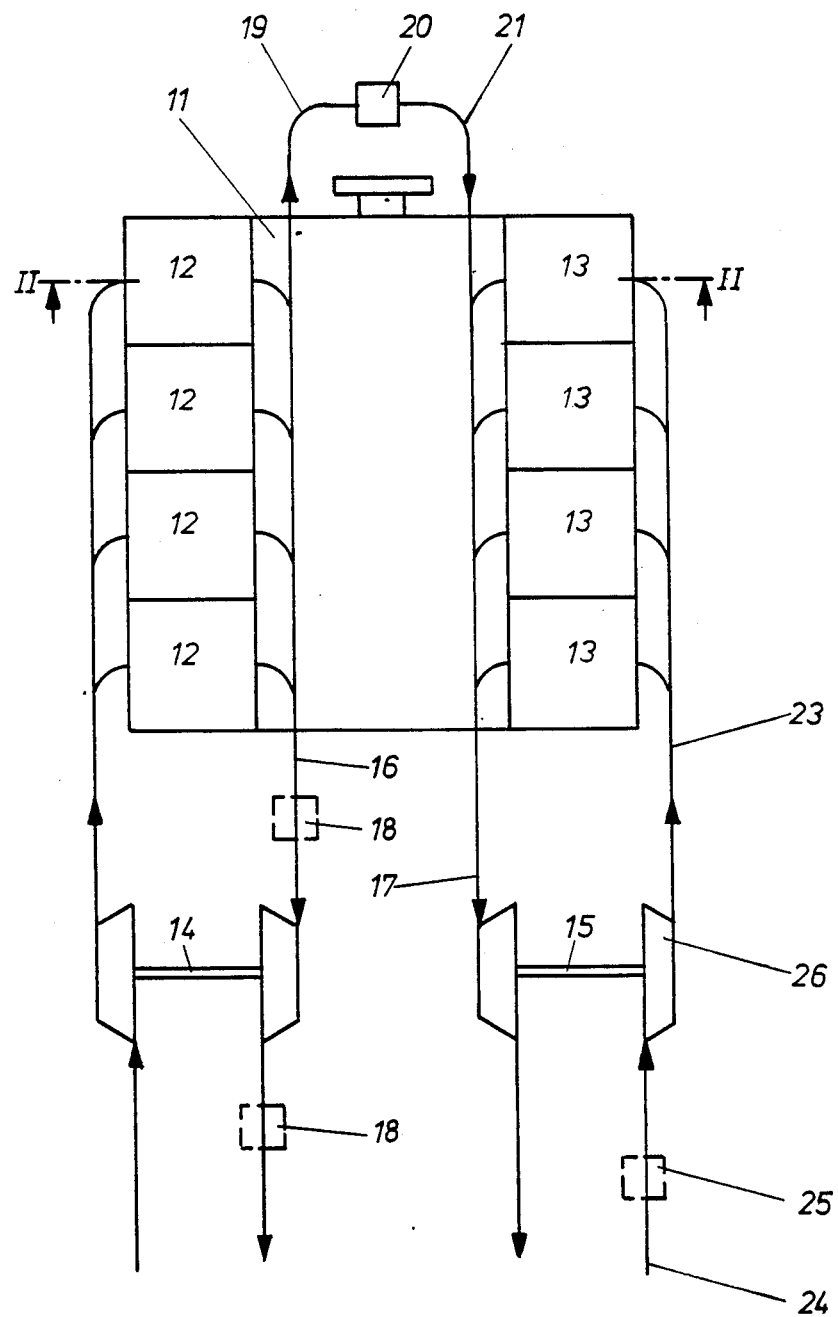

United States Patent [19]

van Rinsum

[11] Patent Number: 4,671,226
[45] Date of Patent: Jun. 9, 1987

[54] SUPERCHARGED MULTI-CYLINDER FOUR-CYCLE DIESEL ENGINE

[75] Inventor: Cornelis van Rinsum, Kressbronn, Fed. Rep. of Germany

[73] Assignee: MTU-Friedrichshafen GmbH, Fed. Rep. of Germany

[21] Appl. No.: 336,604

[22] Filed: Jan. 4, 1982

Related U.S. Application Data

[63] Continuation of Ser. No. 87,866, Oct. 24, 1979, abandoned.

[30] Foreign Application Priority Data

Nov. 2, 1978 [DE] Fed. Rep. of Germany ....... 2847527

[51] Int. Cl.$^4$ ............................................. F02N 17/00
[52] U.S. Cl. .......................... 123/179 F; 123/198 F; 123/323
[58] Field of Search ................. 123/179 F, 179 R, 21, 123/198 F, 323; 60/559, 612; 417/237

[56] References Cited

U.S. PATENT DOCUMENTS

| 1,483,657 | 2/1924 | Glidden | 123/323 |
| 3,032,965 | 5/1962 | Wistner | 123/179 F |
| 3,744,934 | 7/1973 | Ueno | 123/198 F |
| 3,958,900 | 5/1976 | Ueno | 123/198 F |
| 4,191,152 | 3/1980 | Deutschmann | 123/179 F |

Primary Examiner—Craig R. Feinberg
Attorney, Agent, or Firm—Barnes & Thornburg

[57] ABSTRACT

A supercharged multi-cylinder four-cycle diesel engine, in which under partial load operation some cylinders operate as engine while the other cylinders operate as compressor supplying precompressed air which serves for improving the supercharging of the cylinders operating as engine; at least one additional valve is provided in each cylinder head of the cylinders operating as compressor which is to be actuated independently of the gas-exchange valves for engine operation and which controls an additional gas conduction channel that is connected by way of at least one line with the charging air—and/or the exhaust gas line of the cylinders operating as compressor.

15 Claims, 4 Drawing Figures

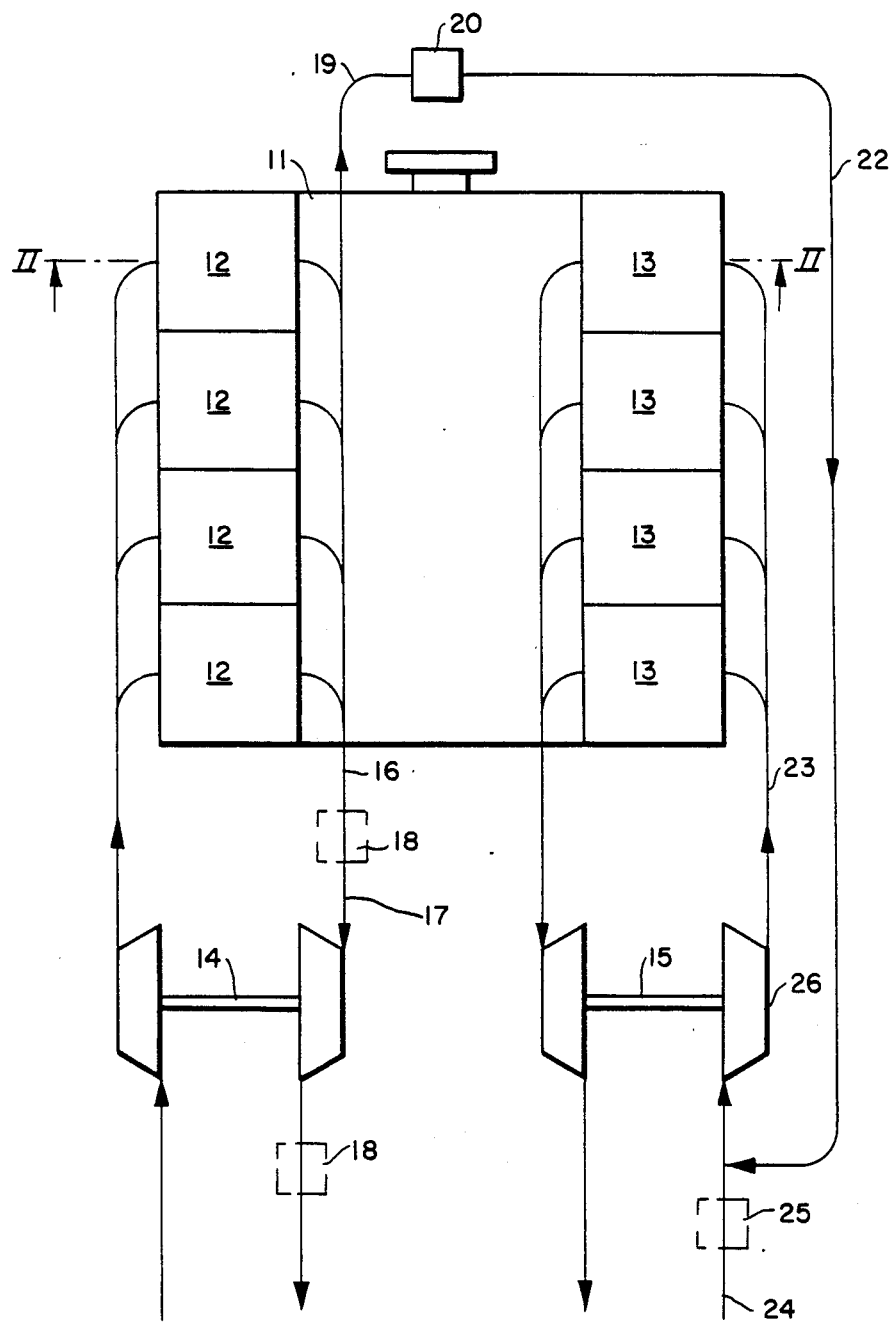

SUPERCHARGED MULTI-CYLINDER FOUR-CYCLE DIESEL ENGINE

This is a continuation of application Ser. No. 087,866, filed Oct. 24, 1979 now abandoned.

The present invention relates to a supercharged multi-cylinder four-cycle diesel engine, in which under partial load operation some cylinders operate as engine whereas the other cylinders supply as compressors pre-compressed air which serves for the improvement of the supercharging in the cylinders operating as engine, and aims at an improved effectiveness of the cylinders operated as compressor for the supercharging.

It is known in connection with diesel engines to so change the control time of the gas-exchange valves present for the engine operation that the cylinders operating for periods of time as compressor operate as two-stroke or two-cycle devices. One suction and compression stroke each effective for the compressed air supply then takes place during each crankshaft rotation.

The installation of a corresponding mechanism into the control of the gas-exchange valves is necessary for changing the valve control periods, which is very costly from a technical point of view. The structural groups in question become considerably more complicated thereby, while also the likelihood of breakdown increases therewith.

The present invention provides a diesel engine of the aforementioned type with a two-cycle operation of the cylinders operated temporarily as compressor, without changing the control periods of the gas-exchange valves present for the engine operation.

The underlying problems are solved according to the present invention in that at least one additional valve which is to be actuated independently of the gas-exchange valves for engine operation and which controls an additional gas conduction channel, is arranged in each cylinder head of the cylinders operating as compressors, and in that the additional gas conduction channel is connected by way of at least one line with the supercharging air and/or the exhaust gas line of the cylinders operating as compressor.

The advantages achieved with the present invention consist especially in that with a diesel engine the air starter and/or decompression valves present in the cylinder heads are utilized additionally, in that the expense of the control of air starter and decompression valves for the compressor operation is slight, that only a short period of time is required for switching over from engine to compressor operation and vice versa, that the switching-over takes place operationally in a very reliable manner and that during the starting operation especially with a diesel engine which includes only one air starter valve in each cylinder head, the exhaust gas channels and lines are already filled with compressed air with the cylinders operating as compressors before supply of precompressed air out of the compressor cylinders begins.

Accordingly, it is an object of the present invention to provide a supercharged multi-cylinder four-cycle diesel engine which avoids by simple means the aforementioned shortcomings and drawbacks encountered in the prior art.

Another object of the present invention resides in a supercharged multi-cylinder four-cycle diesel engine in which a two-cycle operation of the cylinders operating temporarily as compressor is made possible without having to change the control periods of the gas-exchange valves present for engine operation.

A further object of the present invention resides in a supercharged multi-cylinder four-cycle diesel engine in which additional use is made of the air starting and/or decompression valves present in the cylinders while the expenditures for the control of these valves for purposes of compressor operation is small.

Still another object of the present invention resides in a supercharged multi-cylinder four-cycle diesel engine, in which switching-over from engine to compressor operation and vice versa can be realized rapidly and in an operationally reliable manner.

A still further object of the present invention resides in a supercharged multi-cylinder four-cycle diesel engine of the type described above which is characterized by improved performance notwithstanding simplicity and low cost of manufacture.

Figure 2:
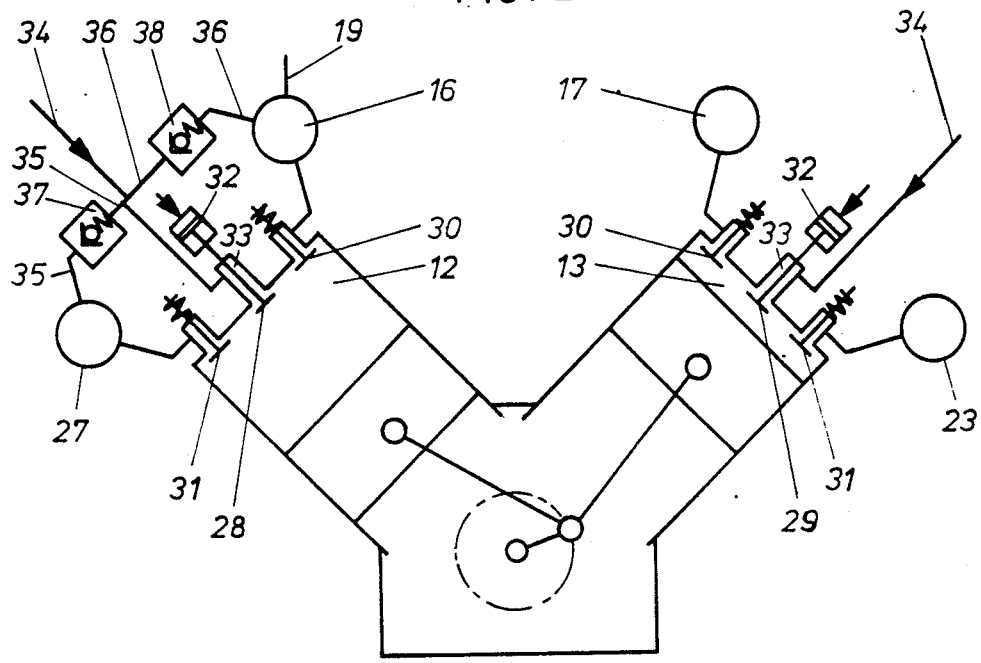
Figure 3:
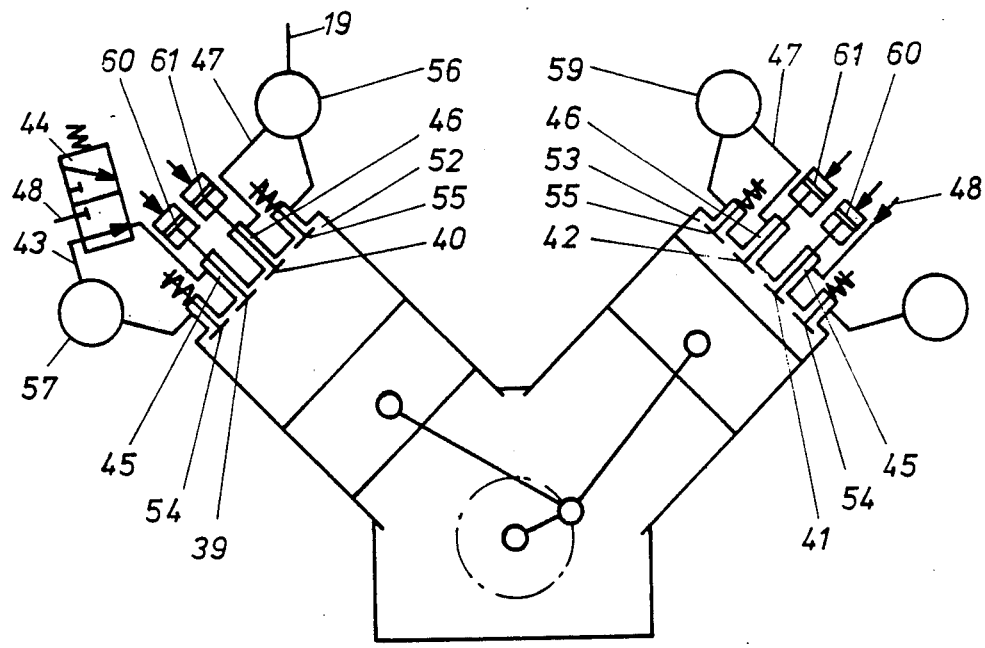

These and other objects, features and advantages of the present invention will become more apparent from the following description when taken in connection with the accompanying drawing which shows, for purposes of illustration only, two embodiments in accordance with the present invention, and wherein:

FIG. 1 is a schematic plan view on a supercharged diesel engine with exhaust gas, supercharging air and alternative compressed air lines in accordance with the present invention;

FIG. 2 is a schematic cross-sectional view through two cylinders of one cylinder row of a V-diesel engine with one compressed air starter valve each, taken along line II—II of FIG. 1; and FIG. 3 is a schematic transverse cross-sectional view through two cylinders of a cylinder row of a modified embodiment of a V-diesel engine with one compressed air starter and one decompression valve each in accordance with the present invention FIG. 4 is a schematic plan view of an alternative embodiment of FIG. 1.

Referring now to the drawings wherein like reference numerals are used throughout the various views to designate like parts, and more particularly to FIG. 1, a supercharged multi-cylinder four-cycle diesel engine 11 is illustrated in this figure, in which under partial load operation one cylinder row with the cylinders 13 operates as engine whereas the cylinders 12 of the other row are operated as compressors. The compressed air from the cylinders 12 is used for improving the supercharging of the cylinders 13 operating as engine.

In the embodiment according to FIGS. 1 and 4, one exhaust gas turbo-supercharging aggregate 14 and 15 is provided for each cylinder row. During the operation of the cylinders 12 as compressors, the exhaust gas line 16 is closed off against the atmosphere by a closure device 18, 18'. The compressed air displaced from the cylinders 12 into the exhaust gas line 16, is taken off by a compressed air line 19, in which is arranged a closure valve 20. For the use of the compressed air for purposes of improving the supercharging, two alternative possibilities are indicated as examples in FIGS. 1 and 4 by the compressed air branch lines 21 of FIG. 1 and 22 of FIG. 4. With the compressed air branch line 21 of FIG. 1, the compressed air is admixed in the exhaust gas line 17 to the exhaust gases from the cylinders 13 and is effective as additional drive for the exhaust gas turbo-aggregate 15.

With the compressed air branch line 22 of FIG. 4, the compressed air is fed to the suction line 24 of the compressor 26, which is closed with respect to the atmosphere by a closure device 25. A two-stage supercharging with a corresponding higher supercharging air pressure in the supercharging air line 23 results therefrom, in which the exhaust gas turbo-charging aggregate 15 contains the second compressor stage.

With the cylinders 12 and 13 illustrated in FIG. 2, of a diesel engine with cylinder rows arranged in V-shape, one air starter valve 28 and 29 is additionally arranged in each cylinder head in addition to the gas-exchange valves 30 and 31 for the engine operation. The air starter valves 28 and 29 can be brought into and retained in the open position by a pressure medium acting on a piston 32 against a compression spring, not shown in detail, independently of the actuation of the gas-exchange valves 30 and 31. Each air starter valve 28 and 29 of the cylinders 12 and 13 controls a gas-conduction channel 33, by way of which the starting compressed air flows from the line 34 to the cylinders 12 and 13 during starting. With the cylinders 12 operating temporarily as compressor, each gas conduction channel 33 is connected by way of a line 35 with the charging air line 27 and by way of a line 36 with the exhaust gas line 16. One check valve 37 and 38 each is arranged in the two lines 35 and 36.

The operation of the arrangement according to FIG. 2 is such that during the compression operation of the cylinders 12, the air starter valve 28 remains continuously open and the gas-exchange valves 31 and 30 retain their control periods as for engine operation. During the first stroke, the intake of air takes place out of the charging air line 27 by way of the inlet valve 31. The air is compressed during the second stroke and is displaced into the exhaust gas line 16 by way of the starter air valve 28 and the check valve 38. During the third cycle, the intake of air takes place again from the charging air line 27, however, this time by way of the check valve 37 and the air starting valve 28. During the fourth stroke, the air is compressed and is now displaced by way of the now opening exhaust valve 30 into the exhaust gas line 16. The four-stroke engine cycle is thus converted during compressor operation into a two-stroke cycle so that during each crankshaft rotation, one suction and one pressure stroke takes place.

The compressed air which is fed during the compressor operation of the cylinders 12 into the exhaust gas line 16, is removed by way of line 19 and fed in the manner described hereinabove.

Already during starting of the diesel engine, only the cylinders 13 operate as engine whereas the cylinders 12 are operated as compressor. The starting compressed air, however, is fed uniformly to the cylinders 12 and 13 of both cylinder rows by way of lines 34. Owing to the arrangement of the check valve 38 in the line 36, the starting compressed air flows thereby also into the exhaust gas line 16 and thus exists in line 19. The volume of these lines is then already filled with compressed air when the cylinders 12 begin their compression operation. The improvement of the supercharging becomes effective thereby more rapidly.

With the arrangement according to FIG. 3, one air starter valve 39 and 41 each and additionally one decompression valve 40 and 42 each are arranged in each cylinder head of the cylinders 52 and 53 in addition to the gas-exchange valves 54 and 55.

Differing from FIG. 2, the gas-conduction channel 45 of the air starter valve 39 is connected by way of line 43 only with the supercharging air line 57. A shifting valve 44 is arranged in line 43 which in one position during the starting establishes the connection between the starting air line 48 and the gas-conduction channel 45, and in the other position connects with each other the gas-conduction channel 45 and the charging air line 57. The gas conduction channels 46 of the decompression valves 40 and 42 are connected with the exhaust gas lines 56 and 59 by way of lines 47. Normally, the decompression valves 40 and 42 are open only during servicing operations in order to facilitate the rotation of the crankshaft.

During the operation of the cylinders 52 as compressors, the air starter and decompression valves 39 and 40 are periodically opened for realizing the two-stroke compression operation. For that purpose, the actuating pistons 60 and 61 of the air starter and decompression valves 39 and 40 of the different cylinders 12 are actuated alternately and corresponding to the correct piston position of each cylinder with an appropriate pressure medium. The necessary pressure medium pulses are supplied by a pulse transmitter of conventional construction (not shown) operating in dependence on the crankshaft position, as is used in a similar manner for the control of the compressed air starter valves during the starting.

The arrangement according to FIG. 3 can be further modified in that in the place of the shifting valve 44, a check valve 37 is arranged in line 43, similar to the check valve 37 in line 35 of FIG. 2. The control of the air starter valve 39 now takes place as described in connection with the embodiment of FIG. 2 and only the decompression valve 40 is controlled periodically.

While I have shown and described two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. Supercharged multi-cylinder four cycle engine in which during partial load operation some cylinders work as an engine, while the other cylinders are operated as a supercharger means in order to deliver compressed air which is used to improve the supercharging in the cylinders which work as an engine;

wherein for the engine function each cylinder comprises in its cylinder head an air-charge passage and an exhaust passage which are controlled by gas exchange valves in that the air-charge passage is in connection with an air-charge manifold and the exhaust passage is in connection with an exhaust manifold, wherein in at least one cylinder operating as a supercharger means there is at least one additional valve means actuated independently of the gas exchange valves for effecting change-over of at least one cylinder from four-cycle engine operation to two-cycle compression operation without changing the control periods of the gas-exchange valves present for the engine operation and for controlling at least one additional gas guide duct means, for at least one cylinder operated as a supercharger means the additional gas guide duct means controlled by the additional valve means is connected via one additional line to the air charging manifold and is also connected via another additional line to the exhaust gas manifold, which manifolds belong to the cylinders operated as supercharger means and at least one of the additional lines is provided with a valve mechanism means.

2. Supercharged multi-cylinder four-cycle engine in which during partial load operation some cylinders work as an engine, while the other cylinders are operated as a supercharger means in order to deliver compressed air which is used to improve the supercharging in the cylinders which work as an engine;

wherein for the engine function each cylinder comprises in its cylinder head an air-charge passage and an exhaust passage which are controlled by gas exchange valves in that the air-charge passage is in connection with an air-charge manifold and the exhaust passage is in connection with an exhaust manifold, wherein in at least one cylinder operating as a supercharger means there is at least one additional valve means actuated independently of the gas exchange valves for causing said gas exchange valves to have control periods during operation of the said additional valve means which are the same as corresponding control periods for said gas exchange valves in the absence of said additional valve means and for controlling at least one additional gas guide duct means, for at least one cylinder operated as a supercharger means the additional gas guide duct means controlled by the additional valve means is connected via one additional line to the air charging manifold and is also connected via another additional line to the exhaust gas manifold, which manifolds belong to the cylinders operated as supercharger means and at least one of the additional lines is provided with a valve mechanism means.

3. Supercharged multi-cylinder four-cycle diesel engine in which during partial load operation some cylinders work as an engine, while the other cylinders are operated as a supercharger means in order to deliver precompressed air which is used to improve the supercharging in the cylinders which work as an engine; wherein in at least one cylinder operating as a supercharger means there is at least one additional valve means which is to be actuated independently of gas exchange valves and which controls at least one additional gas guide duct means, for at least one cylinder operated as a supercharger means the additional guide duct means controlled by the additional valve means is connected via one additional line to an air charging manifold and is also connected via an other additional line to an exhaust gas manifold, which manifolds are allocated to the cylinders operated as supercharger means and each of the additional lines is provided with a valve mechanism means.

4. Supercharged multi-cylinder four-cycle diesel engine according to claim 3, wherein each additional line for each additional gas guide duct means comprises a check valve means.

5. Supercharged multi-cylinder four-cycle diesel engine according to claim 3, wherein
the additional valve means is an air-starter valve means situated in the cylinder head.

6. Supercharged multi-cylinder four-cycle diesel engine according to one of claims 3 or 5, wherein
the gas guide duct means of the air-starter valve means is connected to an air-starter line.

7. Supercharged multi-cylinder four-cycle diesel engine according to one of claims 3 or 5, wherein
a decompression valve means is additionally provided in each cylinder head for controlling a further additional gas guide duct means.

8. Supercharged multi-cylinder four-cycle diesel engine according to claim 7, wherein the valve mechanism means of the one additional line connecting the gas guide duct means of the air-starter valve means to the air charging manifold is a check valve means.

9. Supercharged multi-cylinder four-cycle diesel engine according to claim 7, wherein the valve mechanism means of the one additional line connecting the gas guide duct means of the air-starter valve means to the air charging manifold is a shifting valve means.

10. Supercharged multi-cylinder four-cycle diesel engine according to claim 8, wherein a pulse transmitter means operating in dependence on the crankshaft position periodically opens only the decompression valve means during compressor operation.

11. Supercharged multi-cylinder four-cycle diesel engine according to claim 9, wherein a pulse transmitter means operating in dependence on the crankshaft position is provided for the periodic opening of the air-starter valve.

12. Supercharged multi-cylinder four-cycle diesel engine according to claim 7, wherein
the additional gas guide duct means of the air-starter valve means is connected to an air-starter line.

13. Supercharged multi-cylinder four-cycle diesel engine according to claim 12, wherein
said further additional gas guide duct means serves for connecting the decompression valve means to an exhaust gas line.

14. Supercharged multi-cylinder four-cycle diesel engine according to claim 13, wherein the decompression valve means is a valve mechanism means of the said further additional gas guide duct means.

15. Supercharged multi-cylinder four-cycle diesel engine according to claim 14, wherein a pulse transmitter means operating in dependence on the crankshaft position is provided for the periodic opening of the air-starter valve means and the decompression valve means during compressor operation.

* * * * *